(12) United States Patent
Lee et al.

(10) Patent No.: US 7,009,827 B1
(45) Date of Patent: Mar. 7, 2006

(54) VOLTAGE SWING DETECTION CIRCUIT FOR HOT PLUG EVENT OR DEVICE DETECTION VIA A DIFFERENTIAL LINK

(75) Inventors: Dongyun Lee, San Jose, CA (US); Chieh-Yuan Chao, Fremont, CA (US); Jen-Dong Yuh, Milpitas, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 496 days.

(21) Appl. No.: 10/270,882

(22) Filed: Oct. 15, 2002

(51) Int. Cl.
*H02H 3/20* (2006.01)
*H02H 9/04* (2006.01)

(52) U.S. Cl. .................................. 361/91.1
(58) Field of Classification Search ................ 361/100, 361/91.1; 327/66, 310; 375/257, 258
See application file for complete search history.

(56) References Cited

U.S. PATENT DOCUMENTS

| | | | | |
|---|---|---|---|---|
| 5,010,480 A | * | 4/1991 | Natarajan | 709/246 |
| 5,347,538 A | * | 9/1994 | Marbot | 375/219 |
| 5,648,008 A | * | 7/1997 | Barritt et al. | 219/626 |
| 5,726,592 A | * | 3/1998 | Schulte et al. | 327/65 |
| 5,990,722 A | * | 11/1999 | Jaffard et al. | 327/309 |
| 6,788,113 B1 | * | 9/2004 | Watanabe et al. | 327/66 |
| 2002/0130680 A1 | * | 9/2002 | Meyer et al. | 326/30 |

OTHER PUBLICATIONS

APT Technologies, Inc., et al., "*Serial ATA: High Speed Serialized AT Attachment*", Revision 1.0, Aug. 29, 2001, pp. 1-306.

* cited by examiner

*Primary Examiner*—Brian Sircus
*Assistant Examiner*—Zeev Kitov
(74) *Attorney, Agent, or Firm*—Girard & Equitz LLP (57) ABSTRACT

In some embodiments, a device detection circuit for detecting whether a device is coupled to a differential link, a transmitter (e.g., a transceiver) including such a circuit, and a system including such a transmitter. Preferably, the device detection circuit includes two branches (each branch including a switch), a current source that causes current to flow through either branch, or to be shared by both branches, depending on the state of each switch, and a voltage swing detector configured to detect the voltage between a node (of one branch) and a node (of the other branch) during a device detection operation. In other embodiments, the invention is a device (e.g., a receiver) including a differential termination that can be coupled to a differential link, and an electrical overstress protection circuit coupled to the termination and configured to protect the device against electrical stress during a hot plug event.

25 Claims, 4 Drawing Sheets

VOLTAGE SWING DETECTION CIRCUIT FOR HOT PLUG EVENT OR DEVICE DETECTION VIA A DIFFERENTIAL LINK

TECHNICAL FIELD OF THE INVENTION

The invention pertains to circuitry for detecting whether a device is coupled to a differential link (e.g., a serial link for transmitting a differential signal) and to electrical overstress protection for the device to be detected. The inventive device detection circuitry (including a voltage swing detector) can be included in a transceiver (or other transmitter) coupled to a differential link to detect whether a receiver is coupled to the link.

BACKGROUND OF THE INVENTION

In systems including a transmitter, a link (e.g., a serial link) coupled to the transmitter, and optionally also a receiver coupled to the link, it is desirable to include device detection circuitry in the transmitter. The device detection circuitry determines whether a receiver is coupled to the link. Such device detection circuitry is especially desirable in storage applications in which the receiver is a storage device and the transmitter is a controller.

When both the transmitter and receiver are transceivers, it is often useful for both transceivers to include device detection circuitry. Device detection circuitry (in a transceiver coupled to a link) should be capable of determining when another device is coupled to the link without causing any electrical damage to the input or output circuitry of the transceiver.

For example, systems that comply with the "Digital Visual Interface" ("DVI") standard (adopted by the Digital Display Working Group) exploit a proprietary electrical configuration which generates different common mode levels at both sides of a differential link depending on device presence.

The expression "differential link" is used herein, including in the claims, to denote a link over which at least one differential signal can be transmitted.

The expression "serial differential link" herein denotes' a serial link that is a differential link and thus comprises a conductor pair for transmitting a differential signal. The differential signal is typically a voltage (the potential on one conductor of the pair minus the potential on the other conductor of the pair).

The expression "parallel differential link" is used herein to denote a parallel link that comprises two or more differential links, each differential link comprising a conductor pair for transmitting a differential signal.

The term "transmitter" is used herein in a broad sense to denote any device capable of transmitting a signal (for example, a signal indicative of data) over a link (and optionally also performing additional functions, which can include encoding and/or encrypting data to be transmitted and other operations related to encoding, transmission, or encryption of data). The term "receiver" is used herein in a broad sense to denote any device capable of receiving a signal that has been transmitted over a link (and optionally also performing additional functions, which can include decoding and/or decrypting of received data and other operations related to decoding, reception, or decryption of received data). For example, the term transmitter can denote a transceiver that performs the functions of a receiver as well as the functions of a transmitter.

In some embodiments, the invention is implemented in a device (typically a transceiver or other transmitter) coupled to a serial differential link. In some such embodiments, communication between the device and each other device coupled to the serial differential link is in compliance with the "SATA standard" (the standard known as Serial ATA, Revision 1.0, adopted on Aug. 29, 2001, by the Serial ATA Working Group) for communication between a host and one or more storage devices over one or more serial differential links.

In a class of preferred ("SATA-compliant") embodiments of the invention, the invention is a system including devices configured for communication over at least one serial differential link in compliance with the SATA standard, wherein at least one of the devices includes a device detection circuit that embodies the invention. In some other embodiments, the invention is a SATA-compliant device that includes a device detection circuit that embodies the invention.

The term "termination" is used herein, including in the claims, to denote circuitry which, when coupled to a link, terminates the link with a specific impedance. A termination can consist only of resistive elements so that the impedance is a resistance. Alternatively, a termination comprises at least one resistive element and/or at least one capacitive element and/or at least one inductive element. The term "differential termination" is used herein, including in the claims, to denote a termination configured to be coupled to a differential link to terminate each conductor of the differential link with a specific impedance. A differential termination has a branch for each conductor of the differential link.

SUMMARY OF THE INVENTION

In a class of embodiments, the invention is a circuit for detecting whether a device is coupled to a differential link. In preferred embodiments, the inventive device detection circuit includes two branches (each branch including a switch) and a current source that causes current to flow through either branch, or to be shared by both branches, depending on the state of each switch. During a device detection operation, the switches are controlled so that they alternate between a first state (in which a first switch is open and a second switch is closed) and a second state (in which the first switch is closed and a second switch is open). A voltage swing detector is coupled and configured to detect the voltage between a first node (of one branch) and a second node (of the other branch) during the device detection operation. The voltage swing detector (when enabled) asserts an output that is indicative of the swing in the voltage between the first node and the second node during a device detection operation. For example, in a typical implementation, when the circuit is coupled to a differential link (with the first node coupled to one conductor, and the second node coupled to another conductor, of a conductor pair of the link for transmitting a differential signal), a voltage swing detector output indicating that the swing in the voltage between the first node and the second node does not exceed a threshold value during the device detection operation indicates that a device including a differential termination is coupled to the link, and a voltage swing detector output indicating that the swing in the voltage between the first node and the second node does exceed the threshold value during the device detection operation indicates that no device including such a differential termination is coupled to the link.

When the circuit is included in a transmitter coupled to the link, the output of the voltage swing detector during the device detection operation indicates whether a receiver (including a differential termination) is coupled to the link with the receiver's differential termination terminating the link.

Either or both of the differential termination (of the device to be detected), and the inventive device detection circuit, can be DC coupled or AC coupled to the link. In a class of preferred embodiments, each switch of the inventive device detection circuit is implemented as an MOS transistor (e.g., a PMOS transistor).

In another class of embodiments, the invention is a device (e.g., a receiver) including a differential termination configured to be coupled to a differential link to terminate the link. The device also includes an electrical overstress protection circuit coupled to the differential termination and configured to protect the device against electrical stress during a hot plug event (an event in which the device is coupled to or decoupled from a differential link) without interfering with performance of the inventive device detection operation when the device has been coupled to a differential link. In one example, the device is a receiver having a differential termination coupled to a differential link, and a transmitter coupled to the link can perform a device detection operation in accordance with the invention to determine whether the receiver is coupled to the link. In this example, the receiver's electrical overstress protection circuit protects the receiver against electrical stress (e.g., electrostatic discharge) when the device is first coupled to the link (or re-coupled to the link) or when the device is decoupled from the link. Preferably, electrical overstress protection circuit of the invention provides common mode protection (for the device in which it is installed) against electrical stress (e.g., electrostatic discharge), but does not interfere with recovery (by the device) of differential signals transmitted to the device over the link.

In some embodiments, the invention is a transceiver including input circuitry and output circuitry. The input circuitry includes a differential termination configured to be coupled to a differential link, and also includes an electrical overstress protection circuit coupled to the differential termination and configured to protect the input circuitry against electrical stress during a hot plug event. The output circuitry includes an embodiment of the inventive device detection circuit. When the transceiver is coupled to a differential link (with one branch of the device detection circuit coupled to one conductor, and the other branch of the device detection circuit coupled to the other conductor, of a conductor pair of the link), an output of the voltage swing detector (of the device detection circuit) during a device detection operation indicates whether a receiver (e.g., another transceiver) including a differential termination is coupled to the link.

Another aspect of the invention is a system including a transmitter, a receiver (or other device to be detected), and a differential link between the transmitter and receiver (or other device to be detected), wherein at least one of the transmitter and the receiver (or other device to be detected) includes any embodiment of the invention.

DETAILED DESCRIPTION OF THE PREFERRED EMBODIMENTS

In a class of embodiments, the invention is a circuit for detecting whether a device is coupled to a differential link. Preferred embodiments of such a circuit will be described with reference to FIGS. 1 and 2.

Figure 1:
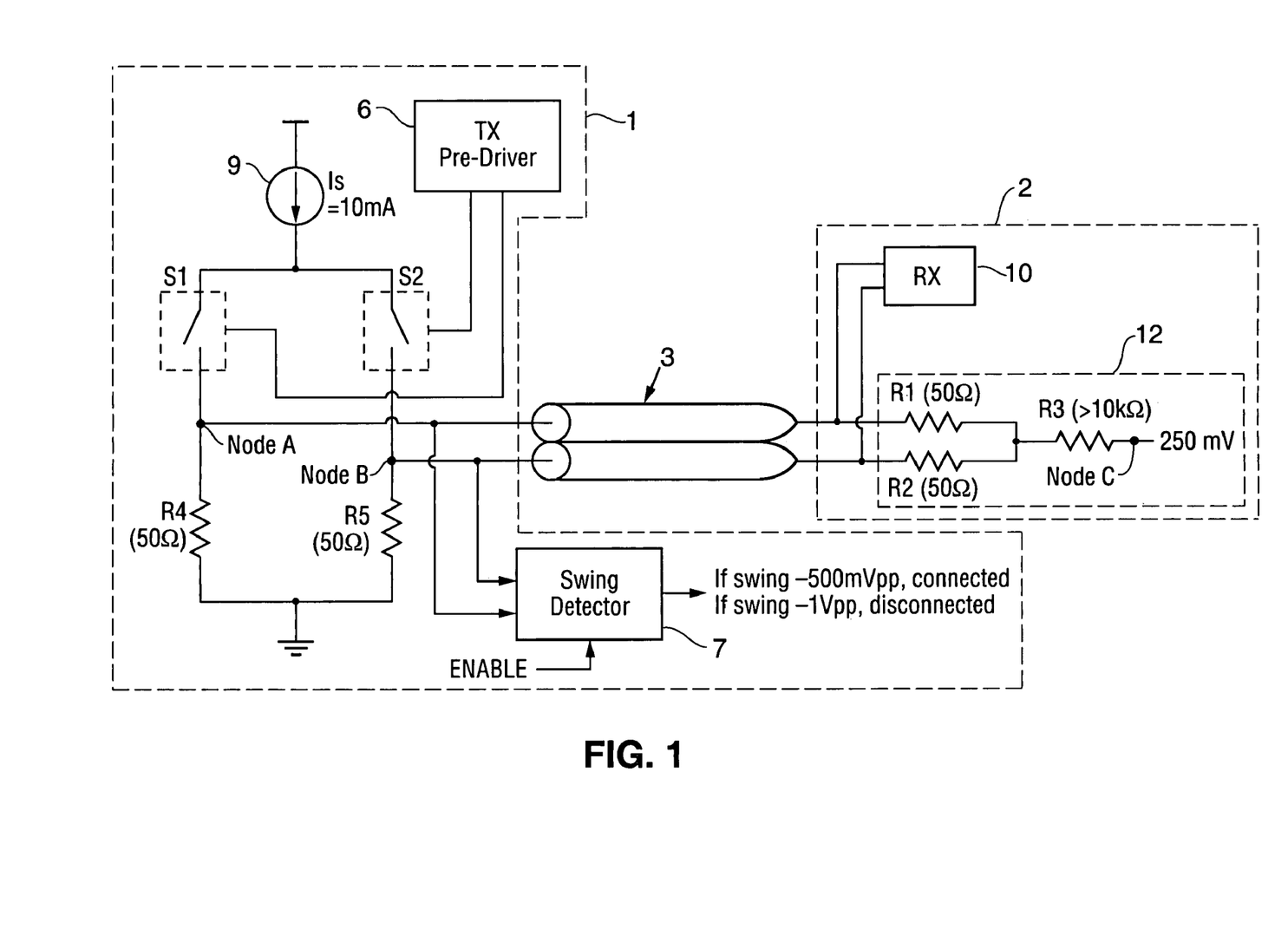
FIG. 1 is a block diagram of a system including transmitter 1 (which implements an embodiment of the invention), receiver 2, and a serial differential link between transmitter 1 and receiver 2.

FIG. 1 is a block diagram of a system including transmitter 1 (which implements the inventive device detection circuit), receiver 2, and serial differential link 3 between transmitter 1 and receiver 2. Transmitter pre-driver circuitry 6, switches S1 and S2, current source 9, and resistors R4 and R5, connected as shown, perform all conventional operations of transmitter 1, including assertion of a differential signal to link 3 for transmission to receiver 2. For example, pre-driver circuitry 6 controls switches S1 and S2 during a data transmission mode to cause transmitter 1 to transmit a differential signal (indicative of binary data) over link 3 from Node A (coupled between switch S1 and one conductor of link 3) and Node B (coupled between switch S2 and another conductor of link 3).

Receiver 2 includes differential termination 12, which in turn comprises resistors R1, R2, and R3, connected as shown, and Node C. In a preferred implementation, Node C is held at 250 mV, each of R1 and R2 has a resistance of 50 Ohms, and R3 has a resistance greater than 10,000 Ohms. Receiver 2 also includes receiver circuitry 10 which performs all conventional functions of receiver 2 (other than the termination function provided by termination 12), including recovery of a differential signal received over link 3 from transmitter 1. As shown in FIG. 1, each of transmitter 1 and receiver 2 is DC coupled to link 3.

The device detection circuit of transmitter 1 includes current source 9, a first branch (including switch S1, Node A, and resistor R4), a second branch (including switch S2, Node B, and resistor R5), and voltage swing detector 7, connected as shown. One type of conventional transmitter includes all elements of transmitter 1 (of FIG. 1) except for voltage swing detector 7. Such a conventional transmitter can be modified to embody the invention by including voltage swing detector 7 (connected to Nodes A and B as shown) and implementing pre-driver circuitry 6 to be capable of controlling the state of each of switches S1 and S2 in the appropriate sequence (to be described below) during a device detection operation in accordance with the invention.

The two branches of device detection circuit of transmitter 1 share the current supplied by source 9. In a preferred implementation, the current supplied by source 9 is 10 mA, and each of R4 and R5 has a resistance of 50 Ohms.

Preferably, each of switches S1 and S2 is an MOS transistor (e.g., a PMOS transistor) whose gate is coupled to pre-driver circuitry 6. During a device detection mode of operation, circuitry 6 controls switches S1 and S2 so that they alternate between a first state (in which switch S1 is open and switch S2 is closed) and a second state (in which switch S1 is closed and switch S2 open). Circuitry 6 also asserts a control signal ("Enable") to voltage swing detector 7 to enable swing detector 7 when desired (e.g., during operation in a device detection mode).

Voltage swing detector 7 is coupled and configured to detect the voltage between Node A and Node B during a device detection mode. During the device detection mode, when Nodes A and B are coupled to differential link 3 as shown, an output of voltage swing detector 7 indicates whether a device (e.g., receiver 2) having a differential termination (not necessarily identical to termination 12 of FIG. 1) is coupled to the link. This is accomplished as follows.

When transmitter 2 is DC coupled to link 3 as shown in FIG. 1, resistors R1, R2, R3, R4, and R5 have the resistances shown in FIG. 1, Node C is maintained at 250 mV, and current source 9 supplies the current indicated in FIG. 1, the potentials at Nodes A and B vary according to the following sequence during the device detection mode:

switches S1 and S2 are in their first state (S1 is open and S2 is closed) so that Node A is at about 250 volts (above ground) and Node B is at about 500 mV above ground;

then, switches S1 and S2 enter their second state (in which S1 is closed and S2 is open) so that Node A is at about 500 volts (above ground) and Node B is at about 250 mV above ground.

This sequence can repeat. In response to the indicated switching of switches S1 and S2, the output of voltage swing detector 7 indicates that the potential difference between Node A and Node B undergoes a voltage swing of about 500 mV (from about +250 mV to about −250 mV) when receiver 2 is coupled to link 3.

When transmitter 2 is not coupled to link 3 (and no element is coupled to the right end of link 3 in FIG. 1), resistors R4 and R5 have the resistances shown in FIG. 1, and current source 9 supplies the current indicated in FIG. 1, the potentials at Nodes A and B vary according to the following sequence during the device detection mode:

switches S1 and S2 are in their first state (S1 is open and S2 is closed) so that Node A is at ground potential and Node B is at 500 mV above ground;

then, switches S1 and S2 enter their second state (in which S1 is closed and S2 is open) so that Node A is at 500 volts (above ground) and Node B is at ground potential.

This sequence can repeat. In response to the indicated switching of switches S1 and S2, the output of voltage swing detector 7 indicates that the potential difference between Node A and Node B undergoes a voltage swing of about 1V (from about +500 mV to about −500 mV) when receiver 2 is not coupled to link 3.

Thus, in the example, if the output of detector 7 indicates that the swing in the voltage between Nodes A and B never exceeds a threshold value (e.g., 750 mV in the example) during a device detection operation, this output indicates that a device (e.g., receiver 2) having a termination of the same type as termination 12 (of FIG. 1) is coupled to link 3. If the output of detector 7 (in the example) indicates that the swing in the voltage between Nodes A and B during the device detection operation exceeds the threshold value, the output indicates that no device having a termination of the same type as termination 12 is coupled to link 3.

Swing detector 7 can also be enabled during normal operation of transmitter 1 (while transmitter transmits a differential signal indicative of data over link 3), e.g., to detect a hot plug event in which a receiver (e.g., receiver 2) is decoupled from link 3. During such normal operation of transmitter 1, pre-driver circuitry 6 could simultaneously close (or simultaneously open) switches S1 and S2. Thus, during normal operation, if both switches S1 and S2 have the same state (at least for a time that exceeds some minimum time interval) during a hot plug event in which receiver 2 is decoupled from link 3, the output of some implementations of swing detector 7 could fail indicate the hot plug event because the output of swing detector 7 accurately indicates that the voltage swing between Nodes A and B stays below a threshold value both before and after the hot plug event. Alternatively, swing detector 7 could be implemented in such a manner that its output is indicative of any hot plug event, even in the described special case that the hot plug event occurs while switches S1 and S2 are in the same state for time that exceeds some minimum time interval (e.g., the output of swing detector 7 could indicate whether the swing in the voltage between Nodes A and B exceeds a predetermined threshold value and does not fall below a second predetermined threshold).

Detector 7 can be implemented in any of many different ways, provided that it asserts an output (when enabled) that is indicative of the swing in the voltage between Nodes A and B, at least during a device detection operation. For example, detector 7 can be implemented simply to output the voltage between Nodes A and B (when detector 7 is enabled), and this output can be further processed (e.g., in other circuitry not shown in FIG. 1) to determine whether the swing of such voltage exceeds a threshold value during a device detection operation. Or, detector 7 can be implemented to have a binary output (when detector 7 is enabled), this binary output being indicative of whether the swing in the voltage between Nodes A and B exceeds a predetermined threshold value (or whether the swing in the voltage between Nodes A and B exceeds a predetermined threshold value and does not fall below a second predetermined threshold).

Numerous variations on the structure of the inventive device detection circuit, and the parameters (e.g., impedances) of its components are contemplated. For example, resistors R4 and R5 can have different resistances and/or current source 9 can supply different current than shown in FIG. 1 Similarly, numerous variations on the structure (and impedance) of the termination in the device to be tested are contemplated. For example, resistances R1 and R2 can have different resistances than shown in FIG. 1. For another example, the current source could sink current from one or both branches of the device detection circuit.

Figure 7:
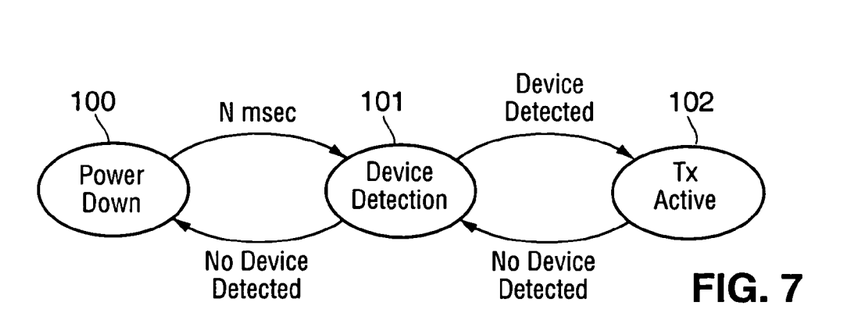
FIG. 7 is a state diagram of typical operation of a transmitter that embodies the invention.

With reference to FIG. 7, we next describe typical operation of transmitter 1 of FIG. 1. If transmitter 1 is configured to operate as shown in FIG. 7, when transmitter 1 is powered up (e.g., when it undergoes a transition from powered down state 100 to state 101), it enters device detection state 101. In state 101, transmitter 1 operates in the device detection mode. If transmitter 1 detects (during state 101) that no receiver is coupled to link 3, it returns to the powered down state 100, and remains in state 100 for some predetermined time (e.g., N msec as indicated in FIG. 7) and then reenters state 101.

If transmitter 1 detects (during state 101) that receiver 2 is coupled to link 3, enters normal operation state 102 in which it transmits a differential signal indicative of data over link 3. If during state 102, transmitter 1 detects a hot plug event in which receiver 2 becomes decoupled from link 3 (i.e., by detecting that neither receiver 2, nor any device having a termination that is similar or identical to that of receiver 2, is detected to link 3), transmitter 1 returns to state 101. Upon returning to state 101, transmitter 1 again operates in the device detection mode to detect whether or not receiver 2 (or any other device having a termination that is similar or identical to that of receiver 2) is coupled to link 3, and then undergoes a transition either to state 100 or to state 102 depending on the outcome of the device detection operation performed during this device detection mode.

At desired times (e.g., during state 100 of FIG. 7), circuitry 6 can deassert the Enable signal (indicated in FIG. 1), thereby disabling voltage swing detector 7.

Figure 2:
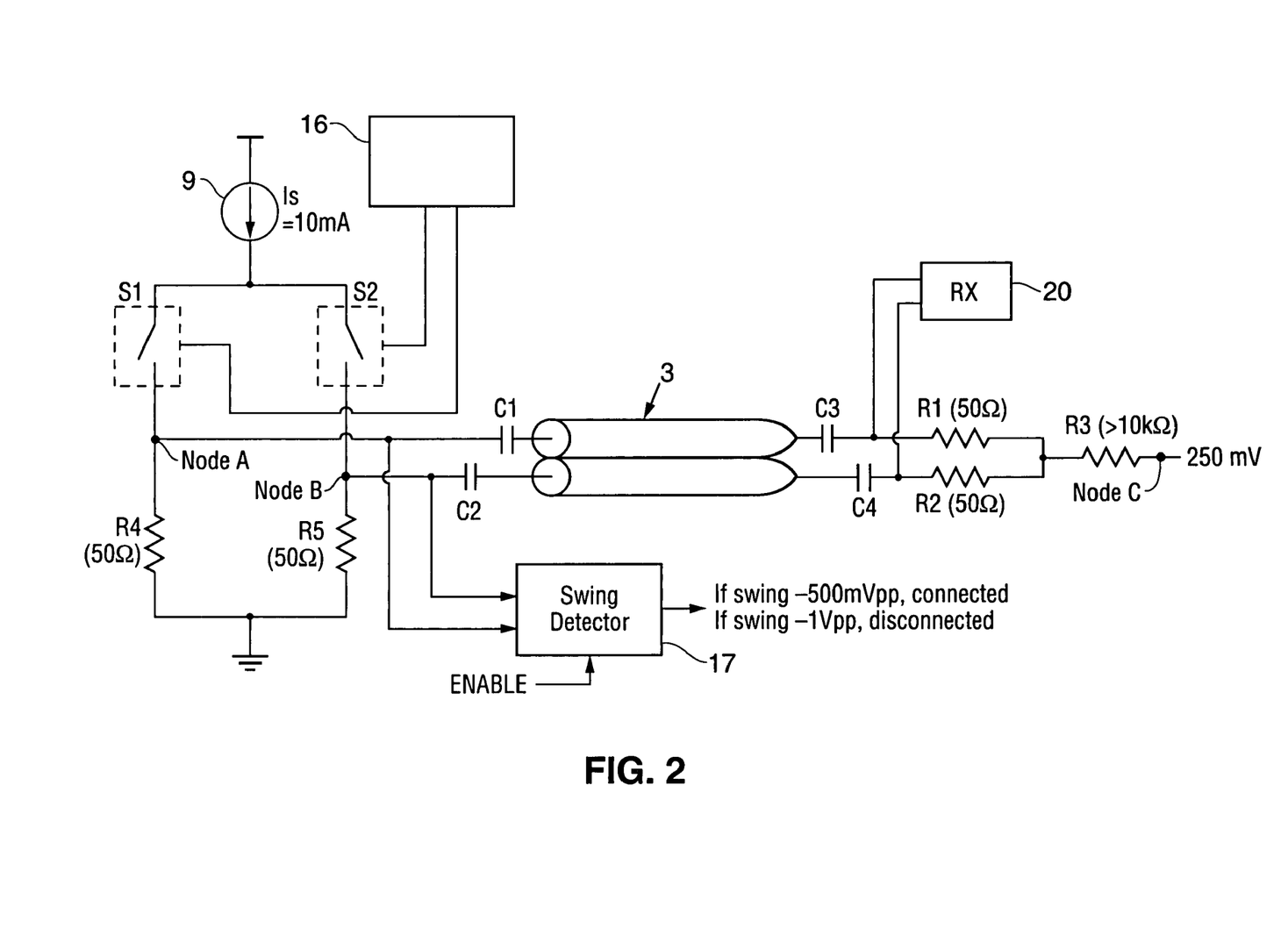
FIG. 2 is a block diagram of a variation on the system of FIG. 1.

FIG. 2 is a block diagram of a variation on the system of FIG. 1. The FIG. 2 system differs from that of FIG. 1 primarily in that its transmitter is AC coupled to link 3 by capacitors C1 and C2 (not DC coupled to link 3 as in FIG. 1), and its receiver is AC coupled to link 3 by capacitors C3 and C4 (not DC coupled to link 3 as in FIG. 1). The transmitter of FIG. 2 is identical to transmitter 1 of FIG. 1 except in that transmitter pre-driver circuitry 16 is implemented differently than circuitry 6 (of FIG. 1) and voltage swing detector 17 is implemented differently than voltage swing detector 7 (of FIG. 1), to the extent dictated by the nature of the coupling to link 3. The receiver of FIG. 2 is identical to receiver 2 of FIG. 1 except in that receiver circuitry 20 is implemented differently than circuitry 10 (of FIG. 1) to the extent dictated by the nature of the coupling to link 3. During the device detection mode, circuitry 16 of FIG. 2 causes switches S1 and S2 to alternate between their first and second states with the appropriate frequency to allow voltage swing detector 17 to assert an output indicative of whether or not the receiver is coupled to link 3.

In other variations on FIG. 1, a receiver (or other device to be detected) includes a termination different from that shown in FIGS. 1 and 2, and/or one or both of the receiver (or other device to be detected) and the transmitter (or other device configured to perform device detection) is coupled to the differential link in a different manner than in FIG. 1 or 2. For example, in some embodiments, the device to be detected includes a termination that is not purely resistive and instead comprises at least one capacitive element and/or at least one inductive element. In another example, one of a transmitter and resistor is DC coupled to the differential link and the other of the transmitter and resistor is AC coupled to the differential link. The common mode of the receiver (or other device to be detected) is weakly terminated to a certain voltage when the device to be detected is DC coupled to the link. The common mode of the receiver (or other device to be detected) can be shorted to any fixed voltage when the device to be detected is AC coupled to the link.

In various embodiments of the invention, the differential link is implemented in any of a wide variety of ways. For example, it can be a cable or it can be a pair of PCB lines.

Figure 3:
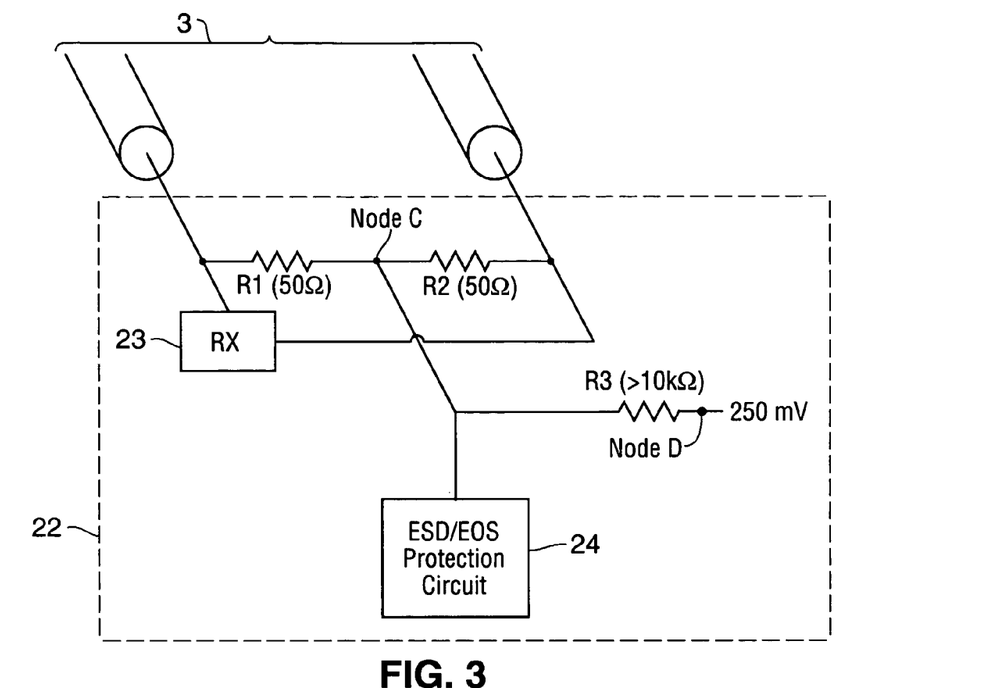
FIG. 3 is a block diagram of a receiver (22) coupled to a serial differential link. Receiver 22 implements an embodiment of the inventive electrical overstress protection circuit.
Figure 4:
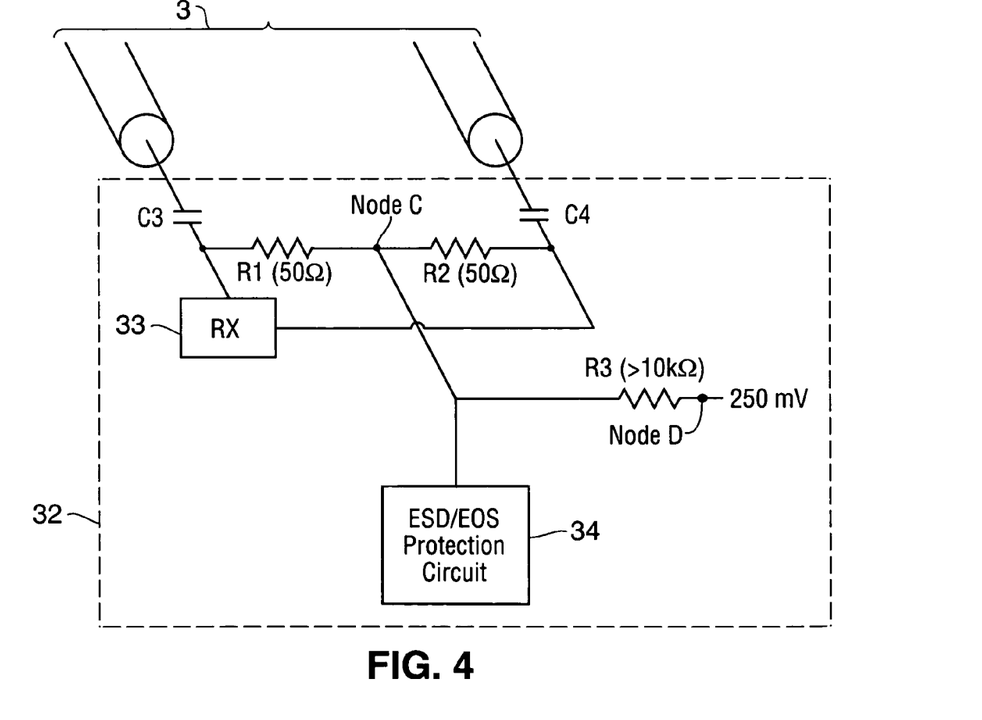
FIG. 4 is a block diagram of a receiver (32) coupled to a serial differential link. Receiver 32 implements an embodiment of the inventive electrical overstress protection circuit.

We next describe preferred embodiments of the inventive receiver (or other device to be detected) with reference to FIGS. 3 and 4. In such embodiments, the invention is a device including a differential termination configured to be coupled to a differential link. The device also includes an electrical overstress protection circuit coupled to the differential termination and configured to protect the device against electrical stress during a hot plug event without interfering with the inventive device detection operation.

FIG. 3 is a block diagram of a receiver (receiver 22) which is DC coupled to serial differential link 3. Receiver 22 includes a differential termination (resistors R1, R2, and R3, connected as shown between Node D (maintained at a fixed potential, which is 250 mV in a preferred implementation in which resistors R1, R2, and R3 have the values shown) and link 3. Receiver 22 also includes electrical overstress protection circuit 24 coupled to Node C (to which each of resistors R1, R2, and R3 is also coupled) and receiver circuitry 23 (which can be identical to receiver circuitry 10 of FIG. 1). A transmitter (not shown) coupled to link 3 can perform a device detection operation in accordance with the invention to determine whether receiver 22 is coupled to link 3. Electrical overstress protection circuit 24 is configured to protect receiver 22 against electrical stress (e.g., electrostatic discharge) during a hot plug event in which receiver 22 is decoupled from link 3 or receiver 22 is re-coupled (or coupled for the first time) to link 3. Preferably, electrical overstress protection circuit 24 provides common mode protection for receiver 22 against electrical stress (e.g., electrostatic discharge) during a hot plug event, but neither interferes with recovery (by circuitry 23) of differential signals transmitted to receiver 22 (e.g., at a very high data rate) over link 3 nor interferes with performance of a device detection operation by a transmitter coupled to link 3.

Each of electrical overstress protection circuit 24 (of FIG. 3) and electrical overstress protection circuit 34 (of below-discussed FIG. 4) is labeled as an "ESD/EOS" ("Electrostatic Discharge and/or other Electrical Overstress") protection circuit and is typically implemented to protect the device that contains it against damage caused by excessive charge inflow to or outflow from the device during a hot plug event.

The inventors contemplate numerous variations on the device shown in FIG. 3 (or in below-discussed FIG. 4). For example, in various embodiments, the inventive device is configured to be coupled to differential links of various types, e.g., differential links implemented as cables or as pairs of PCB lines. For another example, in some embodiments, the device includes a termination that is not purely resistive and instead comprises at least one capacitive element and/or at least one inductive element. For another example, the device is AC coupled to a differential link (as is receiver 32 of FIG. 4, to be described below). The common mode of the device is weakly terminated to a certain voltage when the device is DC coupled to the link. The common mode of the device can be shorted to any fixed voltage when the device to be detected is AC coupled to the differential link.

FIG. 4 is a block diagram of a receiver (receiver 32) which is AC coupled to serial differential link 3 by capacitors C3 and C4. Receiver 32 includes a differential termination (resistors R1, R2, and R3, connected as shown between Node D (maintained at a fixed potential, which is 250 mV in a preferred implementation in which resistors R1, R2, and R3 have the values shown) and link 3. Receiver 32 also includes electrical overstress protection circuit 34 coupled to Node C (to which each of resistors R1, R2, and R3 is also coupled) and receiver circuitry 33 (which can perform the same functions as receiver circuitry 23 of FIG. 3 but is implemented differently than circuitry 23 to the extent dictated by the nature of the coupling to link 3). A transmitter (not shown) coupled to link 3 can perform a device detection operation in accordance with the invention to determine whether receiver 32 is coupled to link 3. Electrical overstress protection circuit 34 is configured to protect receiver 32 against electrical stress (e.g., electrostatic discharge) during a hot plug event in which receiver 32 is decoupled from link 3 or receiver 32 is re-coupled (or coupled for the first time) to link 3.

Preferably, electrical overstress protection circuit 34 provides common mode protection for receiver 32 against electrical stress (e.g., electrostatic discharge), but neither interferes with recovery (by circuitry 33) of differential signals transmitted to receiver 32 (e.g., at a very high data rate) over link 3 nor interferes with performance of a device detection operation by a transmitter coupled to link 3.

Typically, a hot plug event causes excessive charge inflow or outflow to the device being coupled or decoupled from a differential link, especially when the device (e.g., receiver 32) is being AC coupled to the link or decoupled after being AC coupled to the link. Circuit 34 should be configured to protect receiver 32 from damage due to such charge flow (by sourcing or sinking the excessive charge, thus maintaining Node C at a voltage in a predetermined range) when receiver 32 (e.g., circuitry 33 of receiver 32) would otherwise be subject to such damage during a hot plug event.

Figure 5:
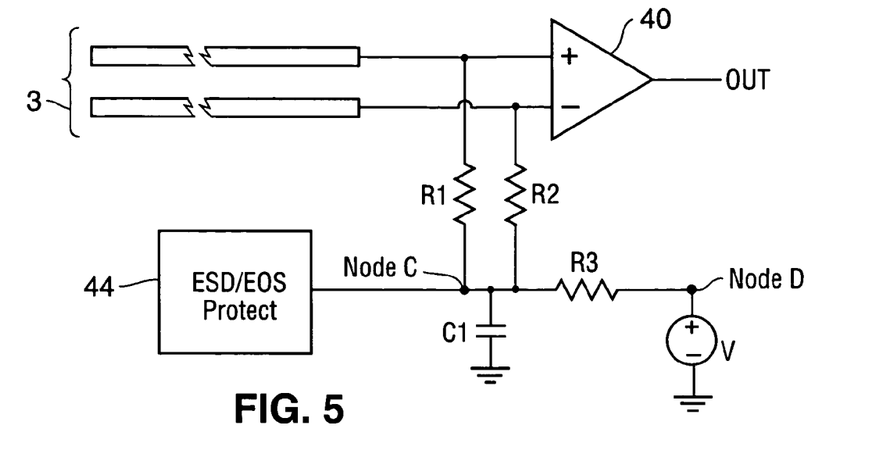
FIG. 5 is a block diagram of some elements of a receiver that embodies the invention.

FIG. 5 is a block diagram of some elements of another receiver that embodies the invention. In FIG. 5, amplifier 40 is coupled to receive a differential signal transmitted over link 3 and to generate a single-ended output signal ("OUT") indicative of the stream of data values determined by the differential signal. The receiver includes a differential termination (resistors R1, R2, and R3, connected as shown between Node D (maintained at a fixed potential, V) and link 3. The receiver also includes electrical overstress protection circuit 44 coupled to Node C (to which each of resistors R1, R2, and R3 and capacitor C1 is also coupled, as shown). A transmitter (not shown) coupled to link 3 can perform a device detection operation in accordance with the invention to determine whether the receiver is coupled to link 3. Electrical overstress protection circuit 44 is configured to protect the receiver against electrical stress (e.g., electrostatic discharge) during a hot plug event.

Figure 6:
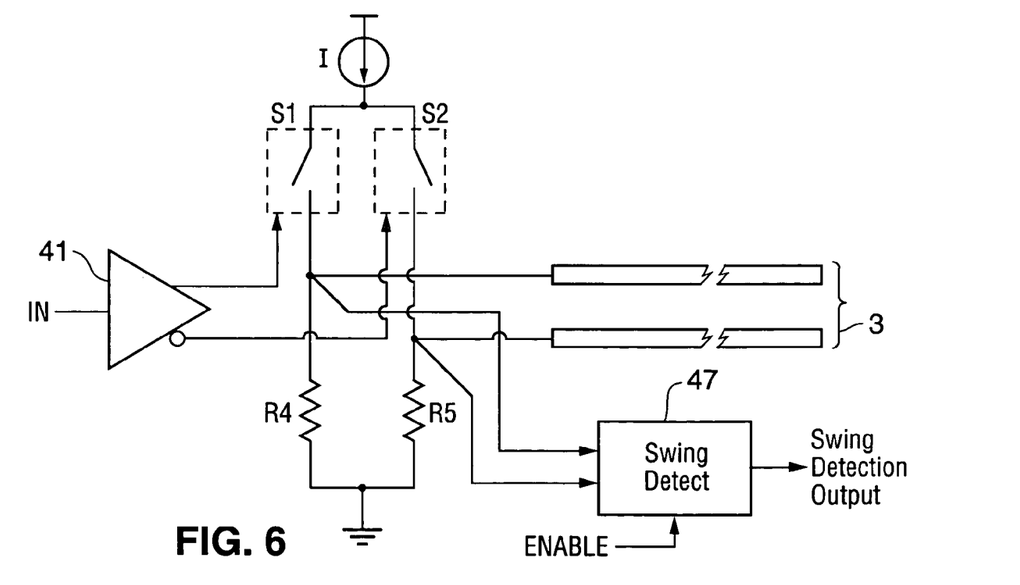
FIG. 6 is a block diagram of some elements of a transmitter that embodies the invention.

FIG. 6 is a block diagram of some elements of another transmitter that embodies the invention. In FIG. 6, amplifier 41 is coupled to receive a single-ended input signal ("IN") indicative of a stream of data values and configured to cause a differential signal to be asserted to link 3 in response to the input signal. The differential signal is indicative of the stream of input data values. The transmitter also includes a device detection circuit including current source I, a first branch (including switch S1 and resistor R4), a second branch (including switch S2 and resistor R5), and voltage swing detector 47, connected as shown.

Current source I, resistors R4 and R5, switches S1 and S2, and voltage swing detector 47 correspond functionally to current source 9, resistors R4 and R5, switches S1 and S2, and voltage swing detector 7 of FIG. 1.

In some embodiments, the invention is a transceiver including input circuitry and output circuitry (e.g., a transceiver that includes both the receiver circuitry of FIG. 5 and the transmitter circuitry of FIG. 6, both configured to be coupled to the same end of link 3). The input circuitry includes a differential termination (e.g., that of FIG. 5) configured to be coupled to a differential link (e.g., link 3 of FIG. 5 or 6), and also includes an electrical overstress protection circuit (e.g., circuit 44 of FIG. 5) coupled to the differential termination and configured to protect the input circuitry against electrical stress during a hot plug event. The output circuitry includes an embodiment of the inventive device detection circuit (e.g., one including the elements shown in FIG. 6). When the transceiver is coupled to a differential link (with one branch of the device detection circuit coupled to one conductor, and the other branch of the device detection circuit coupled to the other conductor, of a conductor pair of the link), an output of a voltage swing detector (e.g., detector 47 of FIG. 6) of the device detection circuit indicates (during a device detection operation) whether a receiver (e.g., another transceiver) including a differential termination is coupled to the link.

Another aspect of the invention is a system including a transmitter, a receiver (or other device to be detected), and a differential link between the transmitter and receiver (or other device to be detected), wherein at least one of the transmitter and the receiver (or other device to be detected) includes any embodiment of the invention.

In a class of preferred ("SATA-compliant") embodiments of the inventive system, the system includes devices configured for communication over at least one serial differential link in compliance with the SATA standard, and at least one of the devices includes an embodiment of the inventive device detection circuit. Preferably also, at least one of the devices (to be detected) implements an electrical overstress protection circuit in accordance with the invention. In another class of embodiments, the invention is a SATA-compliant device that includes an embodiment of the inventive device detection circuit. The SATA standard specifies a common mode level of 250 mV for differential signal transmission over the serial differential link. The systems of FIGS. 1 and 2 provide such a common mode level, and each of them is a SATA-compliant embodiment of the inventive system when the transmitter and receiver thereof satisfies the other requirements of the SATA standard.

It should be understood that while certain forms of the invention have been illustrated and described herein, the invention is not to be limited to the specific embodiments described and shown or the specific methods described. The issued claims define what is regarded as the invention.

What is claimed is:

1. A circuit operable in a device detection mode to detect whether a device is coupled to a differential link, said circuit comprising:

a first branch having a first node configured to be coupled to one conductor of the link, and including a first switch;

a second branch having a second node configured to be coupled to another conductor of the link, and including a second switch;

a current source, coupled to the first branch and the second branch, and operable to cause current to flow through either one of the first branch and the second branch, or to be shared by both the first branch and the second branch, depending on the state of the first switch and the second switch;

switch control circuitry, coupled to the first switch and the second switch, and operable in the device detection mode to sequence the first switch and the second switch between a first state and a second state, wherein the first switch is open and the second switch is closed in the first state, and the first switch is closed and the second switch is open in the second state; and a voltage swing detector, coupled to the first node and the second node, and operable in the device detection mode to detect the voltage between the first node and the second node and to assert an output signal, wherein, when the first node and the second node are coupled to the differential link, the output signal is indicative of whether the device is coupled to the differential link.

2. The circuit of claim 1, wherein the output signal of the voltage swing detector is indicative of whether the voltage between the first node and the second node during the device detection operation has a swing that exceeds a threshold value.

3. The circuit of claim 2, wherein the output signal is a binary signal.

4. The circuit of claim 2, wherein the differential link includes a conductor pair over which a differential signal can propagate, and wherein when the first node is coupled to a first conductor of the conductor pair, the second node is coupled to a second conductor of the conductor pair, and the output signal of the voltage swing detector indicates that the voltage between the first node and the second node has a swing that does not exceed the threshold value during the device detection operation, said output signal indicates that the device is coupled to the differential link.

5. The circuit of claim 1, wherein each of the first switch and the second switch is an MOS transistor having a gate coupled to the switch control circuitry.

6. A system, including:
a transmitter; and
a differential link, coupled to the transmitter and capable of being coupled to a device,
wherein the transmitter includes a device detection circuit, said device detection circuit comprising:
a first branch having a first node configured to be coupled to one conductor of the link, and including a first switch;
a second branch having a second node configured to be coupled to another conductor of the link, and including a second switch;
a current source, coupled to the first branch and the second branch, and operable to cause current to flow through either one of the first branch and the second branch, or to be shared by both the first branch and the second branch, depending on the state of the first switch and the second switch;
switch control circuitry, coupled to the first switch and the second switch, and operable in a device detection mode to sequence the first switch and the second switch between a first state and a second state, wherein the first switch is open and the second switch is closed in the first state, and the first switch is closed and the second switch is open in the second state; and
a voltage swing detector, coupled to the first node and the second node, and operable in the device detection mode to detect the voltage between the first node and the second node and to assert an output signal,
wherein, when the first node and the second node are coupled to the differential link, the output signal is indicative of whether the device is coupled to the differential link.

7. The system of claim 6, wherein the output signal of the voltage swing detector is indicative of whether the voltage between the first node and the second node during operation in the device detection mode has a swing that exceeds a threshold value.

8. The system of claim 7, wherein the differential link includes a conductor pair over which a differential signal can propagate, and wherein when the first node is coupled to a first conductor of the conductor pair, the second node is coupled to a second conductor of the conductor pair, and the output signal of the voltage swing detector indicates that the voltage between the first node and the second node has a swing that does not exceed the threshold value during operation in the device detection mode, said output signal indicates that the device is coupled to the differential link.

9. The system of claim 6, wherein each of the first switch and the second switch is an MOS transistor having a gate coupled to the switch control circuitry.

10. The system of claim 6, wherein the transmitter is DC coupled to the link.

11. The system of claim 6, wherein the transmitter is AC coupled to the link.

12. The system of claim 6, also including the device, wherein said device includes a differential termination coupled to the link.

13. The system of claim 12, wherein the differential termination is DC coupled to the link.

14. The system of claim 12, wherein the differential termination is AC coupled to the link.

15. The system of claim 12, wherein the device also includes:
an electrical overstress protection circuit coupled to the differential termination and configured to protect the device against electrical stress during a hot plug event in which the device is decoupled from or coupled to the link.

16. The system of claim 12, wherein each of the transmitter and the device is a SATA-compliant device.

17. The system of claim 6, wherein the transmitter is a SATA-compliant device.

18. A transmitter, including:
a voltage swing detector; and
differential signal transmission circuitry, wherein the differential signal transmission circuitry comprises:
a first branch including a first node and a first switch;
a second branch including a second node and a second switch, wherein each of the first node and the second node is configured to be coupled to a differential link;
a current source, coupled to the first branch and the second branch, and operable to cause current to flow through either one of the first branch and the second branch, or to be shared by both the first branch and the second branch, depending on the state of the first switch and the second switch; and
switch control circuitry coupled to the first switch and the second switch, and operable in a device detection mode to sequence the first switch and the second switch between a first state and a second state, wherein the first switch is open and the second switch is closed in the first state, and the first switch is closed and the second switch is open in the second state,
wherein the voltage swing detector is coupled to the first node and the second node and operable in the device detection mode to detect the voltage between the first node and the second node and to assert an output signal, and wherein when the first node and the second node are coupled to the differential link, the output signal is indicative of whether a receiver is coupled to the differential link.

19. The transmitter of claim 18, wherein the output signal of the voltage swing detector is indicative of whether the voltage between the first node and the second node during operation in the device detection mode has a swing that exceeds a threshold value.

20. The transmitter of claim 19, wherein when the differential link includes a conductor pair over which a differential signal can propagate, the first node is coupled to a first conductor of the conductor pair, the second node is coupled to a second conductor of the conductor pair, and the output signal of the voltage swing detector indicates that the voltage between the first node and the second node has a swing that does not exceed the threshold value during operation in the device detection mode, said output signal indicates that the receiver is coupled to the differential link.

21. The transmitter of claim 18, wherein each of the first switch and the second switch is an MOS transistor having a gate coupled to the control unit.

22. The transmitter of claim 18, wherein said transmitter is a transceiver including input circuitry and output circuitry, wherein the output circuitry includes the voltage swing detector and the differential signal transmission circuitry.

23. The transmitter of claim 22, wherein the input circuitry includes:
    differential signal reception circuitry, having a third node and a fourth node configured to be coupled to the differential link, wherein the differential signal reception circuitry is configured to recover signals transmitted from a second device over the differential link, said second device being configured to perform a device detection operation;
    a differential termination coupled to the third node and the fourth node; and
    an electrical overstress protection circuit coupled to the differential termination and configured to protect the differential signal reception circuitry against electrical stress during a hot plug event in which the input circuitry is decoupled from or coupled to the differential link.

24. The transmitter of claim 23, wherein the differential termination includes fifth node, a resistor coupled between the third node and the fifth node, and a second resistor coupled between the fourth node and the fifth node, and wherein the electrical overstress protection circuit is coupled to the fifth node.

25. The transmitter of claim 18, wherein said transmitter is a SATA-compliant device.

* * * * *